United States Patent

Tanaka et al.

Patent Number: 6,009,714
Date of Patent: Jan. 4, 2000

[54] CONTROLLER FOR ABSORPTION COLD OR HOT WATER GENERATING MACHINE

[75] Inventors: Syouji Tanaka; Takashi Kaneko; Naoyuki Inoue; Jun Murata; Teruwo Shiraishi; Toshio Matsubara, all of Kanagawa-ken; Nobutaka Matsuda; Motonao Kera, both of Tokyo, all of Japan

[73] Assignee: Ebara Corporation, Tokyo, Japan

[21] Appl. No.: 09/116,943

[22] Filed: Jul. 17, 1998

[30] Foreign Application Priority Data

Jul. 18, 1997 [JP] Japan ................................. 9-209737

[51] Int. Cl.⁷ .................................................. F25B 15/00
[52] U.S. Cl. ............................................................ 62/141
[58] Field of Search ............................ 62/141, 148, 101, 62/476

[56] References Cited

FOREIGN PATENT DOCUMENTS 3-59360  3/1991  Japan.
4-139362  5/1992  Japan.

*Primary Examiner*—William Doerrler
*Attorney, Agent, or Firm*—Armstrong, Westerman, Hattori, McLeland and Naughton

[57] ABSTRACT

A controller for an absorption cold/hot water generating machine, in which a refrigerating cycle is formed by pipe-connecting an evaporator, an absorber, a solution heat exchanger, a low-temperature generator, a condenser, and a high-temperature generator, and the solution level in a header of the high-temperature generator is kept within a prescribed range by controlling the flow rate of the solution fed from the absorber to the high-temperature generator; wherein a solution pump for feeding a solution from the absorber to the high-temperature generator is inverter-driven, and there is provided pressure difference detecting means for detecting a difference in pressure between the high-temperature generator and the absorber; and wherein there is provided control means which controls the solution pump driving frequency of the inverter as a function of a pressure difference between the high-temperature generator and the absorber.

11 Claims, 4 Drawing Sheets

CONTROLLER FOR ABSORPTION COLD OR HOT WATER GENERATING MACHINE

BACKGROUND OF THE INVENTION

The present invention relates to a controller for an absorption cold or hot water generating machine, and particularly, to a flow controller of a solution pump in an absorption cold or hot water generating machine.

In absorption cold/hot water generating machines of this kind, one having the arrangement as shown in FIG. 4 has conventionally been in common use. Normally, an absorption cold/hot water generating machine comprises, as shown in FIG. 4, an evaporator 1, an absorber 2, a condenser 3, a low-temperature generator 4, a high-temperature generator 5, a solution pump 6, a refrigerant pump 7, a cooling water pump 17, a solution heat exchanger 22, and a cooling tower 23, with piping 9 for connecting these components.

In the absorption cold/hot water generating machine, usually a refrigerant is sent and sprayed in the evaporator 1 by means of the refrigerant pump 7, where it evaporates, and takes heat from water sent from a load L by means of a cold/hot water pump 18, thereby producing cold water. Refrigerant vapor produced through evaporation in the evaporator 1 is absorbed, in the absorber 2, by a high-concentration solution (absorbing solution) (hereinafter referred to as the "concentrated solution") fed from the high-temperature generator 5 through the piping $9_1$ and $9_2$ and the solution heat exchanger 22 and sprayed there and the concentrated solution thus becomes a lower-concentration solution (hereinafter referred to as the "diluted solution").

The diluted solution in the absorber 2 is sent to the high-temperature generator 5 and the low-temperature generator 4 by the solution pump 6 via piping $9_3$ and $9_4$ respectively, heated in the high-temperature generator 5 and the low-temperature generator 4, respectively, and sent back to the absorber 2 via piping $9_1$, $9_5$ and $9_2$ in the form of the concentrated solution to continue the refrigerating cycle. Cooling water in the cooling tower 23 is circulated by the cooling water pump 17 through the absorber 2, the condenser 3 and the cooling tower 23. The solution pump 6, the refrigerant pump 7, the cooling water pump 17 and the cold/hot water pump 18 are controlled by the controller 10.

In the high-temperature generator 5, the diluted solution sent from the absorber 2 by the solution pump 6 is heated, and the refrigerant is evaporated to produce the concentrated solution which flows into the header 8. The concentrated solution returns from the header 8 through the solution heat exchanger 22 to the absorber 2. A float 19 is provided in the header 8, and a valve 19a operating in conjunction with this float is provided at an entry piping $9_3$ into the high-temperature generator 5. When a predetermined amount of solution is not present in the header 8, the valve 19a is controlled to the opening side so as to feed the diluted solution to the high-temperature generator 5, and when the header 8 contains a predetermined amount of solution, the valve 19a is controlled to the closing side so as to keep a constant liquid level in the high-temperature generator 5. When the valving is not completely effected by the valve 19a, the solution pump 6 is started or stopped by detecting the liquid level in the header 8 by means of electrodes 15 and 16.

The liquid level in the high-temperature generator is kept constant for the following reason. That is, when the amount of solution sent to the high-temperature generator 5 exceeds a certain level, the solution overflows and enters the piping for the refrigerant, thus contaminating the refrigerant and leading to a lower evaporation temperature of the refrigerant. When the amount of the solution is under a certain lower limit, on the contrary, a refrigerant gas is mixed into the solution piping, thus causing noise or corrosion, possibly even leading to crystallization. The amount of diluted solution fed from the absorber 2 to the high-temperature generator 5 must therefore be appropriate.

As described above, the absorption cold/hot water generating machine of the conventional arrangement does not adopt an inverter for controlling the solution pump, but controls the amount of solution by the use of a float valve comprising the float 19 and the valve 19a operating in conjunction therewith in the header 8. Upon controlling the amount of solution with the float valve, however, the squeezing or valving property of the valve 19a is rough and, thus, when a load is small, a frequent start and stop operation of the solution pump 6 is needed, and circulating flow rate of the solution tends to be excessive, resulting in poor efficiency of the machine.

In addition, the size of the float 19 tends to be large, because the valve 19a must be driven by floating force of the float 19. This results in a larger width of the header, leading to a larger exterior size of the absorption cold/hot water generating machine.

SUMMARY OF THE INVENTION

The present invention was developed in view of the disadvantages described above, and has as its object to provide a compact absorption cold/hot water generating machine which permits finer and more efficient flow rate control of the solution pump and having a smaller width of the header, by controlling the flow rate of the solution pump or revolution number of the solution pump by an inverter.

To solve the above-mentioned problems, according to a first aspect of the invention there is provided a controller for an absorption cold/hot water generating machine, in which a refrigerating cycle is provided by pipe-connecting an evaporator, an absorber, a solution heat exchanger, a low-temperature generator, a condenser, and a high-temperature generator, and the solution level in a header of the high-temperature generator is kept within a prescribed range by controlling the flow rate of the solution fed from the absorber to the high-temperature generator. A solution pump for feeding a solution from the absorber to the high-temperature generator is inverter-driven, and there is provided pressure difference detecting means for detecting a difference in pressure between the high-temperature generator and the absorber. Control means is provided for controlling the solution pump driving frequency of the inverter as a function of a pressure difference between the high-temperature generator and the absorber so as to keep the solution level in the header within the prescribed range.

According to a second aspect of the invention, the controller is further provided with means for correcting the function of the control means which, when the solution level in the header becomes higher than the prescribed range, corrects the function downward; and when the solution level becomes lower than the prescribed range, corrects the function upward.

According to a third aspect of the invention, in the controller for an absorption cold/hot water generating machine according to the first or second aspect, the pressure difference detecting means comprises means for detecting a pressure of refrigerant vapor in the high-temperature generator or a temperature corresponding to the pressure, and the driving frequency of the solution pump of the inverter is controlled as a function of the pressure of refrigerant vapor in the high-temperature generator or the temperature corresponding to the pressure.

According to a fourth aspect of the invention, in the controller for an absorption cold/hot water generating machine according to the third aspect, a temperature detecting means is provided for detecting temperature of cold or hot water to be fed to a load, and the driving frequency of the solution pump of the inverter is controlled as functions of the pressure of refrigerant vapor in the high-temperature generator or the temperature corresponding to the pressure and temperature of cold or hot water to be fed to the load.

According to a fifth aspect of the invention in the controller for an absorption cold/hot water generating machine according to any one of the above-mentioned aspects, a temperature detecting means is provided for detecting temperature of cooling water to be fed to the absorber, and the control means correct a change in the solution flow rate caused under the effect of the cooling water temperature exerted on the solution concentration based on the detected cooling water temperature.

According to a sixth aspect of the invention, in the controller for an absorption cold/hot water generating machine according to any one of the second to fifth aspects, downward or upward correction of the function is continued while combustion of the high-temperature generator continues and is reset when combustion is discontinued.

According to the present invention as arranged above, the solution pump is inverter-driven, and the solution pump driving frequency is controlled as a function of the pressure difference between the high-temperature generator pressure and the absorber pressure as described above.

Accordingly, unlike with a solution amount control effected by a float valve as in the conventional art, it is possible to perform fine control of the solution flow rate, and to operate the absorption cold/hot water generating machine with high efficiency.

In addition, since a float valve is not used, it is possible to reduce a width of the header, and provide a compact absorption cold/hot water generating machine.

The above and other objects, features and advantages of the present invention will become more apparent from the following description when taken in conjunction with the accompanying drawings in which a preferred embodiment of the present invention is shown by way of illustrative examples.

PREFERRED EMBODIMENTS OF THE INVENTION

Figure 1:
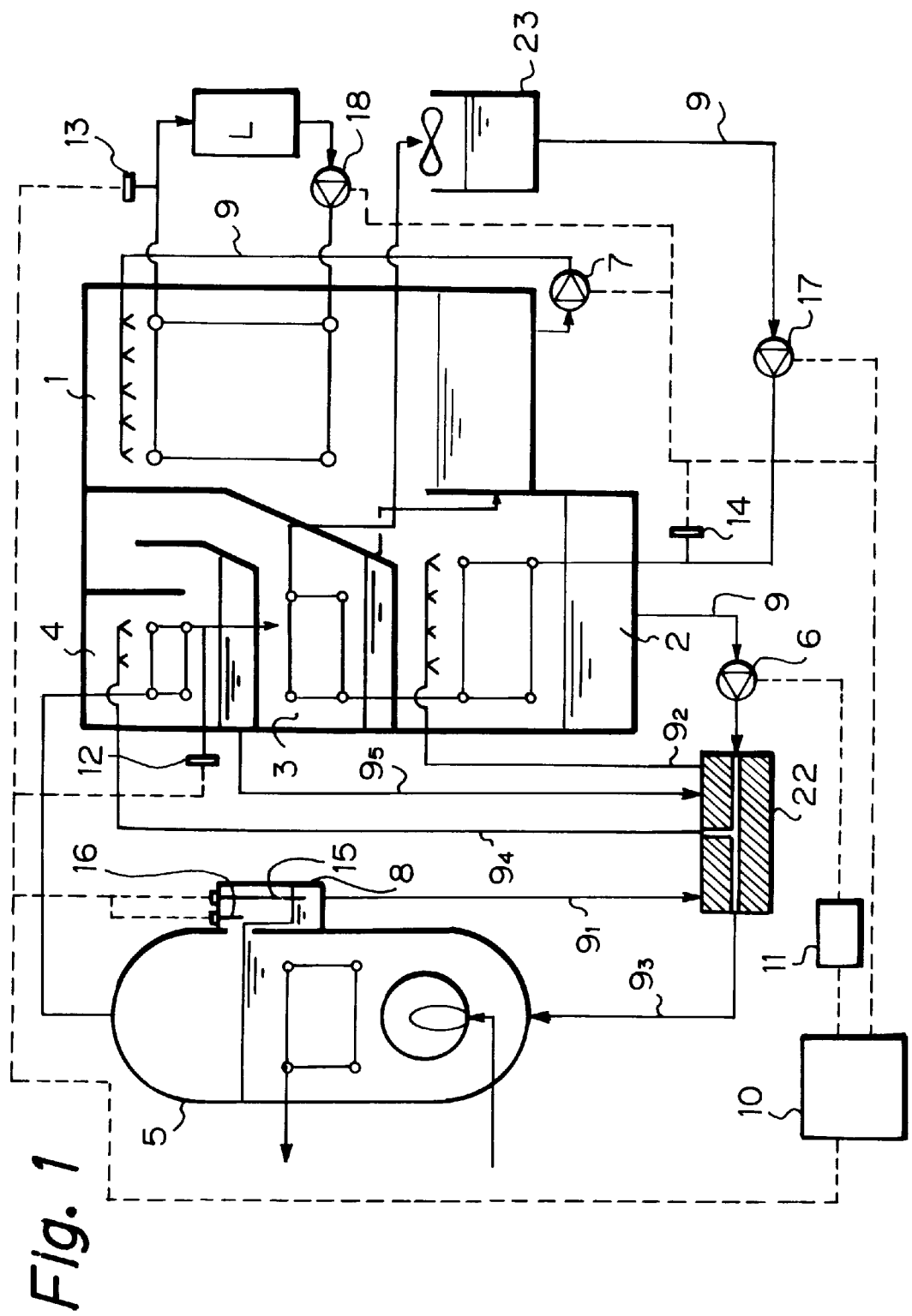
FIG. 1 is a diagram illustrating the arrangement of the absorption cold/hot water generating machine according to one embodiment of the invention.
Figure 4:
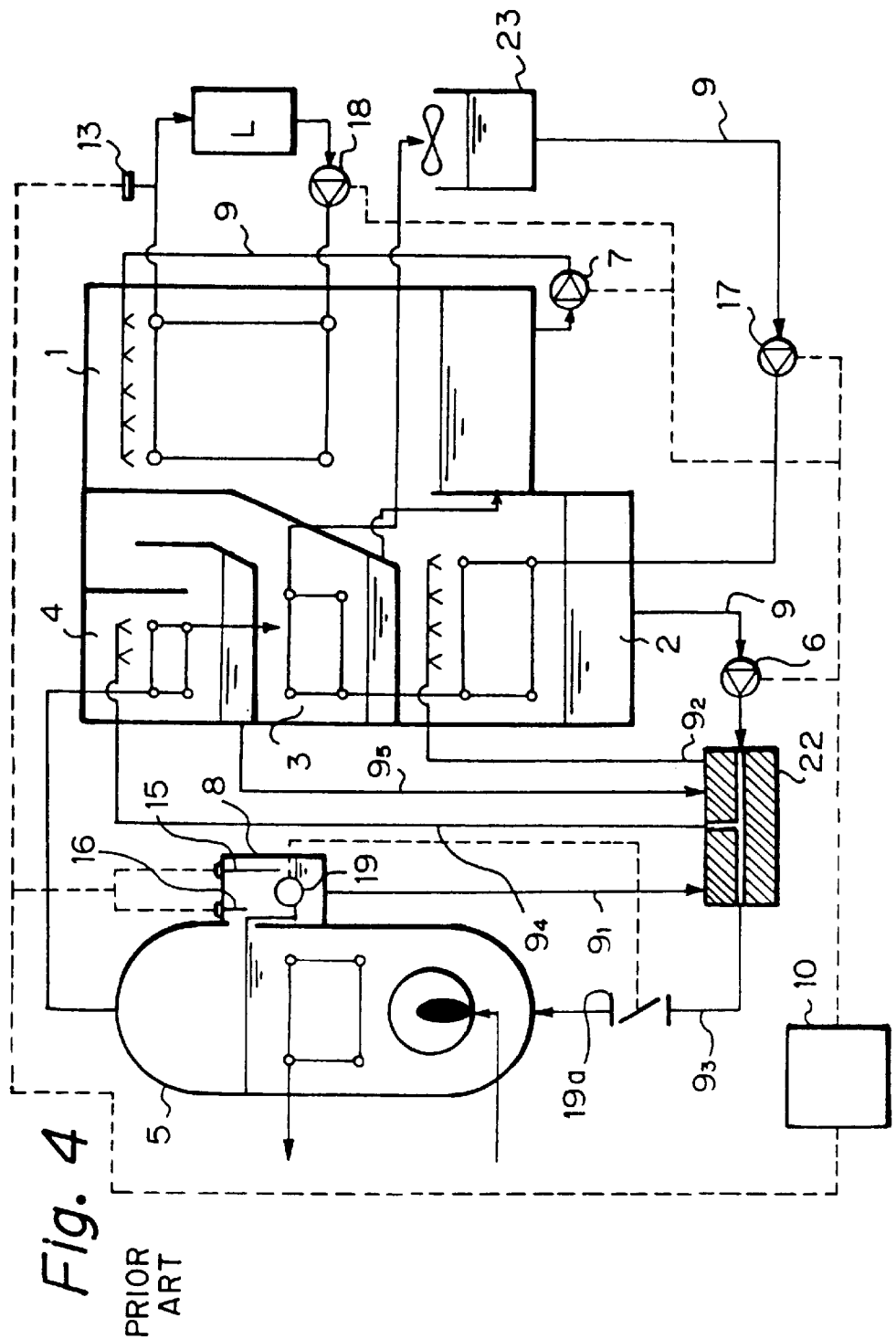
FIG. 4 is a diagram illustrating the arrangement of the conventional absorption cold/hot water generating machine.

Some embodiments of the present invention will now be described with reference to the drawings. FIG. 1 is a diagram illustrating the arrangement of the absorption cold/hot water generating machine of the invention. In FIG. 1, components having the same reference numerals as those shown in FIG. 4 represent the same or corresponding components and, thus, repetitive description is omitted.

In FIG. 1, the reference numeral 11 is an inverter for driving the solution pump 6; 12 is a saturation temperature detecting sensor for detecting the saturation temperature of refrigerant vapor produced in the high-temperature generator 5; 13 is a temperature detecting sensor for detecting temperature of cold/hot water fed to a load L; and 14 is a temperature detecting sensor for detecting temperature of cooling water from a cooling tower 23.

Figure 2:
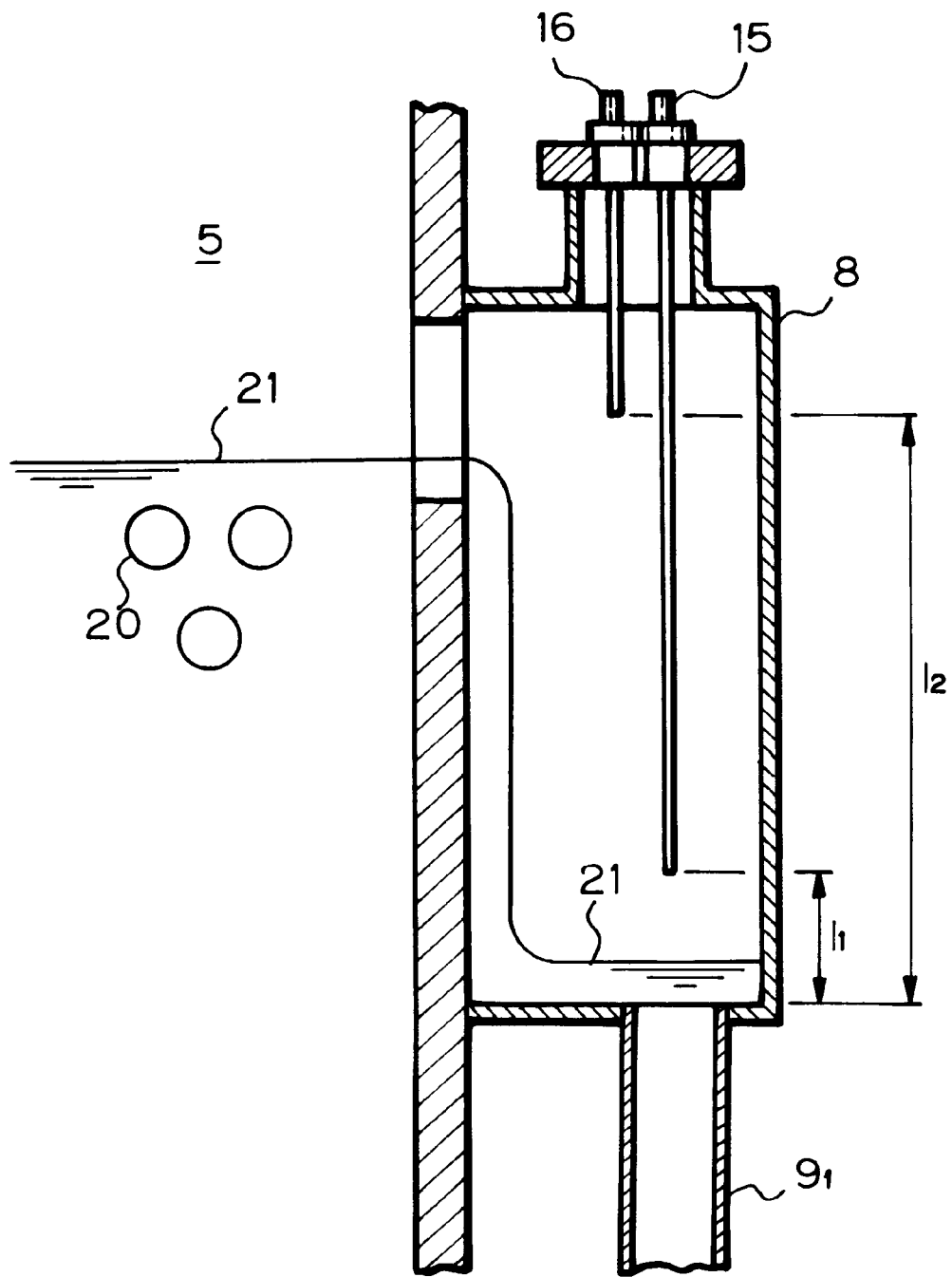
FIG. 2 is a diagram illustrating details of the header section of the high-temperature generator shown in FIG. 1.

FIG. 2 illustrates details of a header section of the high-temperature generator 5. In FIG. 2, the reference numeral 20 is a fire tube as a heat source; 21 is a liquid level of the solution; and the fire tube 20 is located within the solution. Electrodes 15 and 16 for detecting the liquid level of the solution are provided in the header 8: the electrode 15 is for detecting a low level $l_1$, and the electrode 16 is for detecting a high level $l_2$.

The inverter 11 controls the operating frequency of the solution pump 6 (or the rotating speed of the solution pump 6) in response to a command from the controller 10, thereby controlling the flow rate of the diluted solution to be fed from the absorber 2 to the high-temperature generator 5. That is, the flow rate of the diluted solution is controlled by the inverter 11 so that the solution accumulated in the header 8 keeps a constant level, like in a float valve comprising a float 19 and a valve 19a shown in FIG. 4.

Now, consideration will be made of the flow of the solution in the absorption cold/hot water generating machine. A return solution from the high-temperature generator 5 to the absorber 2 in an amount which is in balance with a driving force minus resistance in the piping 9 is circulated in the absorption cold/hot water generating machine, where the driving force is determined by summing fixed positional head (difference in height between the solution level in the header 8 and the solution spraying position in the absorber 2) and the pressure difference between the high-temperature generator 5 and the absorber 2. The solution pump 6 as the feeding means should therefore feed the diluted solution at a flow rate corresponding to that of the return solution from the absorber 2 to the high-temperature generator 5. The solution concentration and the inner pressure of the high-temperature generator 5 may have an effect thereon and the amount of circulation of the solution may be dependent upon these factors.

However, from among factors causing a change in driving force of circulation of the solution, the pressure in the high-temperature generator 5 and the pressure in the absorber 2 prevail. The frequency of the inverter 11 driving the solution pump 6 should therefore be basically determined by using the pressure in the high-temperature generator 5 and the pressure in the absorber 2 as a function of the pressure difference. The pressure difference between the high-temperature generator 5 and the absorber 2 can be determined by detecting it by providing a pressure difference transmitter, or by providing sensors detecting the pressure in the high-temperature generator 5 and the pressure in the absorber 2, and subtracting the detected pressure in the absorber 2 from the detected pressure in the high-temperature generator 5.

Providing a pressure difference transmitter, however, is costly. Since the pressure in the absorber 2 is normally much smaller than the pressure in the high-temperature generator 5 (about 1% of that of the high-temperature generator 5), there is practically no problem to detect the pressure in the high-temperature generator 5, and use the thus detected pressure as the pressure difference between the high-temperature generator 5 and the absorber 2. Providing a pressure sensor, however, involves difficult operations regarding air-tightness and maintenance. It is therefore practical to detect the saturation temperature of refrigerant vapor produced in the high-temperature generator 5 by means of a saturation temperature detecting sensor 12, and to use the detected temperature instead of the pressure in the high-temperature generator.

Figure 3:
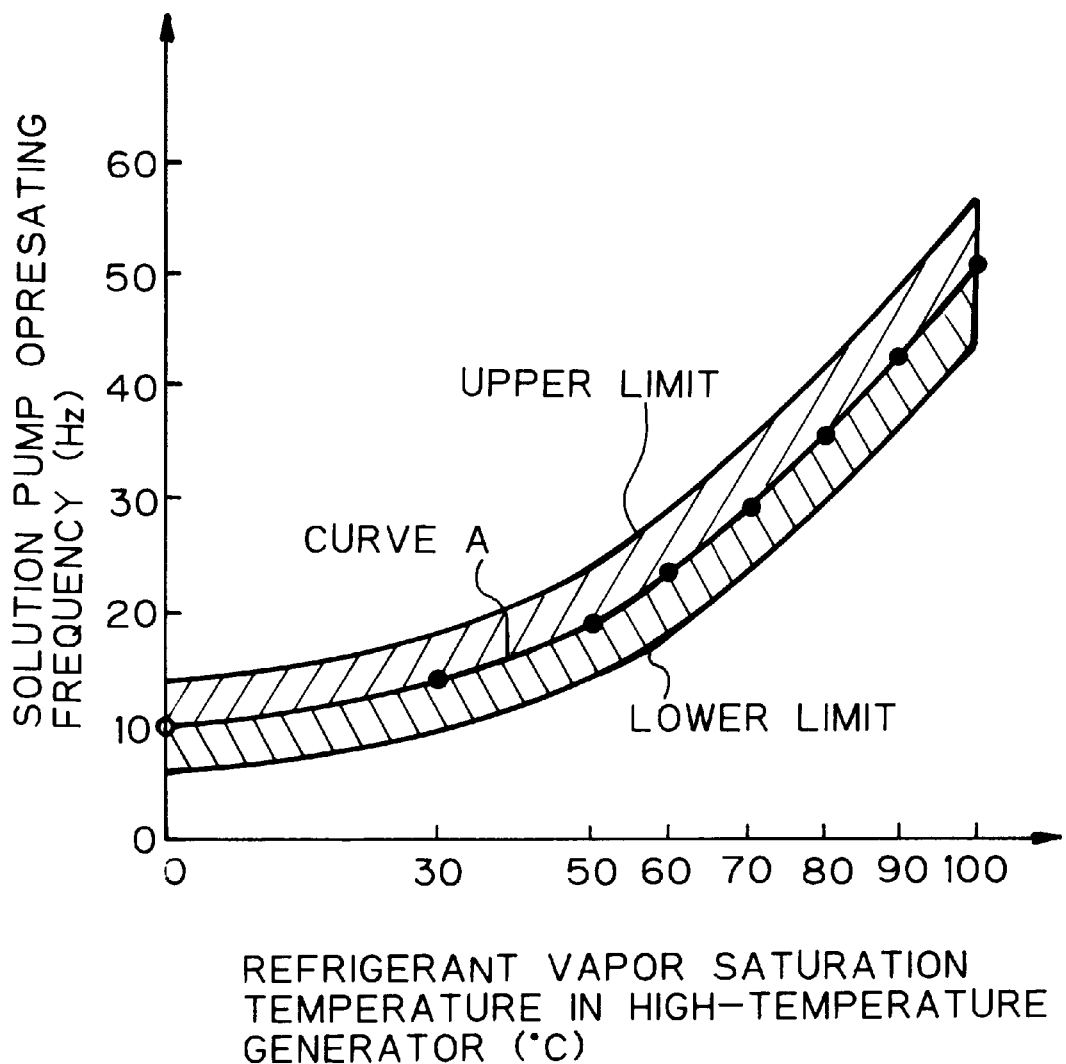
FIG. 3 is a graph illustrating the relationship between the refrigerant vapor saturation temperature of the high-temperature generator and the solution pump operating frequency.

The relationship between the saturation temperature of refrigerant vapor in the high-temperature generator 5 (temperature detected by the saturation temperature detecting sensor 12) and the solution pump operating frequency (frequency signal fed from the inverter 11 to the solution pump 6) for keeping the solution in the header within a prescribed range is represented in FIG. 3. As the refrigerant vapor saturation temperature in the high-temperature generator 5 increases, since the inner pressure of the high-temperature generator 5 increases, there is an increase in the amount of circulation of the solution. Accordingly, as is demonstrated by the curved line A in FIG. 3, the revolutions (i.e. rotating speed) of the solution pump 6 should be increased by increasing the operating frequency of the solution pump 6 in response to an increase in the refrigerant vapor saturation temperature in the high-temperature generator 5, thereby feeding the diluted solution from the absorber 2 to the high-temperature generator 5 at a flow rate in match with the amount of circulation.

It is sufficient to cover a range from 0 to 100° C. as the refrigerant vapor saturation temperature of the high-temperature generator 5. For example, eight points of refrigerant vapor saturation temperature in the high-temperature generator 5 including 0° C., 30° C., 50° C., 60° C., 70° C., 80° C., 90° C. and 100° C. are selected, and operating frequencies of the solution pump corresponding to these eight points of refrigerant vapor saturation temperature are determined. In response to the selected points of temperature, the solution pump operating frequencies are, for example, set here at 10 Hz, 14 Hz, 18 Hz, 23 Hz, 25 Hz, 35 Hz, 42 Hz and 50 Hz, respectively.

The solution pump operating frequencies corresponding to the selected points of refrigerant vapor saturation temperature in the high-temperature generator 5 are in beforehand tabulated and stored in the controller 10. The controller 10 reads out a solution pump frequency corresponding to a refrigerant vapor saturation temperature detected by the saturation temperature detecting sensor 12, and controls the inverter 11 so as to output corresponding frequency to the solution pump 6. By this, it is possible to feed the diluted solution from the absorber 2 to the high-temperature generator 5 in an amount corresponding to the solution flow rate of circulation, which is determined by the driving force resulting from the inner pressure of the high-temperature generator 5.

During normal operation of the absorption cold/hot water generating machine, the refrigerant vapor saturation temperature is within a range of from 50° C. to 100° C. The temperature points within this range is therefore set at intervals of 10° C., and 0° C. and 30° C. at an intermediate point are set as temperatures at starting or dilution operation. The solution pump operating frequency at middle point between two set points is determined by calculating the temperature in accordance with a linear equation. The number of set points of the refrigerant vapor saturation temperature may be greater than eight. The solution pump operating frequencies for the individual set temperatures may vary depending on coding or warming air-conditioning, model of the machine or circumstances of the operating site.

When the solution pump 6 is operated at a frequency corresponding to a refrigerant vapor saturation temperature detected by the saturation temperature detecting sensor 12, and as the result thereof if the solution level in the header 8 is kept within a range between the low level $l_1$ detected by the electrode 15 and the high level $l_2$ detected by the electrode 16, there will be no problem. Actually, however, as described above, since there is a difference in the conditions of load, it could result in an excessively high or low liquid level under the effect of the change in concentration and other factors acting on the circulation flow rate of the solution.

Therefore, in the absorption cold/hot water generating machine shown, when the electrode 16 detects a high solution level $l_2$, the controller 10 controls the inverter 11 to correct the solution pump operating frequency downward. The amount of correction should be at a ratio of about 2 to 3 Hz a minute. Similarly, when the electrode 15 detects a low solution level $l_1$, the controller 10 controls the inverter 11 to correct the solution pump frequency upward. The amount of correction should be at a ratio of about 2 to 3 Hz in a minute. The maximum amount of correction should be within a range of ±10 Hz.

As described above, the solution level in the header 8 is controlled so as to be within a range between the low level $l_1$ and the high level $l_2$. The amount of correction can be set differently in the controller 10 for a chilled water and a hot water for each type of absorption cold-hot water generating machine. If there is no large fluctuation in the state of load, the amount of correction would be the same for a while and, therefore, is kept constant while combustion of a burner of the high-temperature generator 5 continues.

That is, on the assumption that an amount of correction is −3 Hz, when a change occurs in the refrigerant vapor saturation temperature in the high-temperature generator 5, a new solution pump operating frequency for this changed refrigerant vapor saturation temperature to be commanded to the solution pump 6 by the inverter 11 is calculated, and this amount of correction is added to (i.e. 3 Hz subtracted from) the calculated value. This amount of correction should preferably be reset when combustion of the high-temperature generator 5 is discontinued or when operation of the absorption cold-hot water generating machine is stopped. This ensures a stable amount of feed of the solution by absorbing the effect of the other factors than the refrigerant vapor saturation temperature in the high-temperature generator 5 or the pressure difference between the high-temperature generator 5 and the absorber 2.

In the above-mentioned embodiment, solution pump operating frequencies which correspond to refrigerant vapor saturation temperatures are tabulated in advance and stored in the controller, and a solution pump operating frequency corresponding to a saturation temperature detected by the sensor 12 is read out for controlling the inverter 11. However, since the controller 10 is normally provided with a micro-computer, a method of calculating a solution pump operating frequency in response to each detected temperature from the saturation temperature detecting sensor 12 may be adopted.

The pressure in the high-temperature generator 5 may be represented by the saturation temperature of the refrigerant vapor detected by the saturation temperature detecting sensor 12 as stated above. The pressure in the absorber 2 may be represented by the cold/hot water temperature detected by the cold/hot water temperature detecting sensor 13. This is because the pressure in the absorber 2 can be determined based on the temperature in the absorber 2 which, in turn, can be determined based on the temperature of the cold/hot water to be fed to the load. Therefore, it is possible to determine the pressure difference between the pressure in the high-temperature generator 5 and the pressure in the absorber 2 based on the saturation temperature of the refrigerant vapor and the cold/hot water temperature. Particularly, during operation of a room cooler, the cold water temperature is 7° C. in most cases. During operation of a room heater, the hot water temperature varies within a range of from 40° C. to 60° C. The pressure difference can therefore be determined using these temperatures. Since the cold/hot water temperature is used in capacity control of the absorption cold/hot water generating machine, a cold/hot water temperature detecting sensor 13 is provided as a standard component. Therefore, by using it, it is not necessary to provide a new cold/hot water temperature detecting sensor 13.

The temperature of cooling water from the cooling tower 23 is a factor which may exert an effect on the concentration of the diluted solution. In the embodiment shown, therefore, the cooling water temperature is detected by the cooling water temperature detecting sensor 14, and the change in flow rate of the solution resulting from the change in solution concentration is corrected by incorporating the cooling water temperature thus detected into the controller 10.

As described above, according to the present invention the solution pump is inverter-driven, and the solution pump driving frequency is controlled as a function of the pressure difference between the high-temperature generator and the absorber. Therefore the following advantages are given.

(1) Since the solution pump is inverter-driven, it is possible to perform scrupulous or fine control of the solution flow rate, and to operate the absorption cold/hot water generating machine at a high efficiency.

(2) Because a float valve is not used, it is possible to reduce width of the header, and provide a compact absorption cold/hot water generating machine.

(3) Since the solution pump for feeding a diluted solution from the absorber to the high temperature generator is inverter-driven and the solution pump driving frequency of the inverter is controlled as a function of a pressure difference between the high temperature generator and the absorber so as to keep the solution level in the header within a prescribed level, it is possible to obtain a optimum circulating flow rate of the solution and operate the absorption cold/hot water generating machine at a high efficiency.

What is claimed is:

1. A controller for an absorption cold/hot water generating machine, in which a refrigerating cycle is formed by pipe-connecting an evaporator, an absorber, a solution heat exchanger, a low-temperature generator, a condenser, and a high-temperature generator, and the solution level in a header of the high-temperature generator is kept within a prescribed range by controlling the flow rate of the solution fed from the absorber to the high-temperature generator;

wherein a solution pump for feeding a solution from said absorber to the high-temperature generator is inverter-driven, and there is provided pressure difference detecting means for detecting a difference in pressure between said high-temperature generator and said absorber; and wherein there is provided control means for controlling the solution pump driving frequency of said inverter as a function of a pressure difference between said high-temperature generator and said absorber so as to keep the solution level in said header within the prescribed range.

2. A controller for an absorption cold/hot water generating machine, according to claim 1, wherein said control means further comprises function correcting means which, when the solution level in said header becomes higher than the prescribed range, corrects said function downward;

and when the solution level becomes lower than said prescribed range, corrects said function upward.

3. A controller for an absorption cold/hot water generating machine according to claim 1 or 2, wherein said pressure difference detecting means comprises means for detecting a pressure of refrigerant vapor in the high-temperature generator or a temperature corresponding to said pressure, and the driving frequency of the solution pump of said inverter is controlled as a function of the pressure of refrigerant vapor in the high-temperature generator or the temperature corresponding to said pressure.

4. A controller for an absorption cold/hot water generating machine according to claim 3, wherein there is provided means for detecting a temperature of cold or hot water to be fed to a load, and the driving frequency of the solution pump of said inverter is controlled as functions of the pressure of refrigerant vapor in the high-temperature generator or the temperature corresponding to said pressure and temperature of cold or hot water to be fed to said load.

5. A controller for an absorption cold/hot water generating machine according to any one of claims 1 or 2, wherein there is provided means for detecting temperature of cooling water to be fed to said absorber, and said control means correct a change in the flow rate of the solution caused under the effect of the cooling water temperature exerted on the solution concentration based on said detected cooling water temperature.

6. A controller for an absorption cold/hot water generating machine according to any one of claims 1 or 2, wherein said downward or upward correction of said function is continued while combustion of said high-temperature generator continues and is reset when combustion is discontinued.

7. A controller for an absorption cold/hot water generating machine according to claim 3, wherein there is provided means for detecting temperature of cooling water to be fed to said absorber, and said control means correct a change in the flow rate of the solution caused under the effect of the cooling water temperature exerted on the solution concentration based on said detected cooling water temperature.

8. A controller for an absorption cold/hot water generating machine according to claim 4, wherein there is provided means for detecting temperature of cooling water to be fed to said absorber, and said control means correct a change in the flow rate of the solution caused under the effect of the cooling water temperature exerted on the solution concentration based on said detected cooling water temperature.

9. A controller for an absorption cold/hot water generating machine according to claim 3, wherein said downward or upward correction of said function is continued while combustion of said high-temperature generator continues and is reset when combustion is discontinued.

10. A controller for an absorption cold/hot water generating machine according to claim 4, wherein said downward or upward correction of said function is continued while combustion of said high-temperature generator continues and is reset when combustion is discontinued.

11. A controller for an absorption cold/hot water generating machine according to claim 5, wherein said downward or upward correction of said function is continued while combustion of said high-temperature generator continues and is reset when combustion is discontinued.

* * * * *